(12) United States Patent
Jambres (10) Patent No.: US 11,969,802 B2
(45) Date of Patent: Apr. 30, 2024

(54) CUTTING TOOL

(71) Applicant: Filip Jambres, Mississauga (CA)

(72) Inventor: Filip Jambres, Mississauga (CA)

( * ) Notice: Subject to any disclaimer, the term of this patent is extended or adjusted under 35 U.S.C. 154(b) by 556 days.

(21) Appl. No.: 17/252,812

(22) PCT Filed: Jun. 18, 2019

(86) PCT No.: PCT/CA2019/050854
§ 371 (c)(1),
(2) Date: Dec. 16, 2020

(87) PCT Pub. No.: WO2019/241881
PCT Pub. Date: Dec. 26, 2019

(65) Prior Publication Data
US 2021/0276104 A1 Sep. 9, 2021

Related U.S. Application Data (60) Provisional application No. 62/686,147, filed on Jun. 18, 2018.

(51) Int. Cl.
*B23B 27/16* (2006.01)
*B26D 7/26* (2006.01)

(52) U.S. Cl.
CPC ........ *B23B 27/1677* (2013.01); *B26D 7/2614* (2013.01); *B23B 2260/022* (2013.01); *B23B 2260/03* (2013.01); *B23B 2260/136* (2013.01)

(58) Field of Classification Search
CPC ... B23B 29/12; B23B 29/04; B23B 2205/045; B23B 2205/04; B23B 2270/08; B23B 2270/09; B23B 27/1651; B23B 27/1644; B23B 27/1677
See application file for complete search history.

(56) References Cited

U.S. PATENT DOCUMENTS

| 3,965,553 | A | | 6/1976 | Faber |
| 4,011,049 | A | * | 3/1977 | McCreery ........... B23B 27/1662 |
| | | | | 407/103 |
| 4,244,666 | A | | 1/1981 | Erickson et al. |
| 5,100,268 | A | | 3/1992 | Nakayama et al. |
| 5,536,120 | A | | 7/1996 | Miller |

(Continued)

FOREIGN PATENT DOCUMENTS

WO 2019241881 A1 12/2019

OTHER PUBLICATIONS

International Preliminary Report on Patentability dated Dec. 30, 2020 in respect of PCT/CA2019/050854.

(Continued)

*Primary Examiner* — Alan Snyder
(74) *Attorney, Agent, or Firm* — Bereskin & Parr LLP/S.E.N.C.R.L., s.r.l.

(57) ABSTRACT

A cutting tool for turning and/or boring operations can include a holder, a replaceable insert supported by the holder in a cutting position, and a clamp releasably coupled to the holder and configured to bear against the insert to retain the insert in the cutting position. The clamp can be releasably coupled to the holder without a threaded fastener. The cutting tool can include a retention mechanism for releasably connecting the holder and the clamp, the retention mechanism having alternate locked and unlocked states.

20 Claims, 13 Drawing Sheets

(56) References Cited

U.S. PATENT DOCUMENTS

| | | |
|---|---|---|
| 5,820,311 A | 10/1998 | Grun et al. |
| 5,921,724 A | 7/1999 | Erickson et al. |
| 5,944,457 A | 8/1999 | Tjernstrom |
| 8,408,847 B2 | 4/2013 | Rysavy |
| 8,449,224 B2 | 5/2013 | Kobayashi |
| 2015/0231704 A1* | 8/2015 | Eriksson ............ B23B 27/1677 407/103 |

OTHER PUBLICATIONS

International Search Report dated Aug. 27, 2019 in respect of PCT/CA2019/050854.

* cited by examiner

CUTTING TOOL

CROSS-REFERENCE TO RELATED APPLICATIONS

This is a national stage application of International Application No. PCT/CA2019/050854 filed on Jun. 18, 2019, which claims priority to U.S. Provisional Application No. 62/686,147 filed on Jun. 18, 2018, and the entire contents of each are hereby incorporated herein by reference.

FIELD

The present disclosure relates generally to lathe cutting tools having replaceable inserts.

BACKGROUND

The following paragraphs are not an admission that anything discussed in them is prior art or part of the knowledge of persons skilled in the art.

U.S. Pat. No. 5,100,268 describes an insert clamped tool that includes a tool holder, a cutting insert, a clamp and a pressing mechanism for pressing the clamp to urge the cutting insert against the bottom and the side walls of the insert-receiving pocket. The tool holder includes an insert-receiving pocket formed at a forward end thereof and having a bottom and side walls. The tool holder has an inclined surface sloping inward in a direction away from the insert-receiving pocket. The cutting insert is received on the insert-receiving pocket. The clamp is held into abutting engagement with the cutting insert. The clamp has a sliding face held in contacting engagement with the inclined surface of the tool holder.

U.S. Pat. No. 5,820,311 describes a lathe cutting tool assembly found of a tool holder which has a seat to accommodate a cutter insert, the cutter insert being provided with a clamping groove or bore. The insert is held in the tool holder by a clamping shoe. The clamping shoe is tightly secured to on the tool holder. To protect the clamping shoe and improve the seating of the cutter insert in the tool holder, a clamping plate is secured to the clamping shoe and lies upon the cutter insert. A projection is provided on the bottom of the clamping plate facing the cutter insert and is in clamping contact with the groove or bore. The tool assembly is especially adapted for a turning chisel.

U.S. Pat. No. 5,944,457 describes a toolholder that forms a seat in which a cutting insert is seated. The insert is held in place by a clamp having front and rear portions. The front portion engages within a center hole of the insert, and the rear portion engages an inclined surface of the toolholder so that the clamp is pushed downwardly and rearwardly when attached by a screw. A coil spring surrounds the screw and is compressed between the clamp and the toolholder to bias the clamp upwardly. An upper end of the spring is disposed in a bore of the clamp which is inclined relative to the screw, whereby the spring abuts a rear portion of a wall of the bore to bias the clamp rearwardly as well as upwardly.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
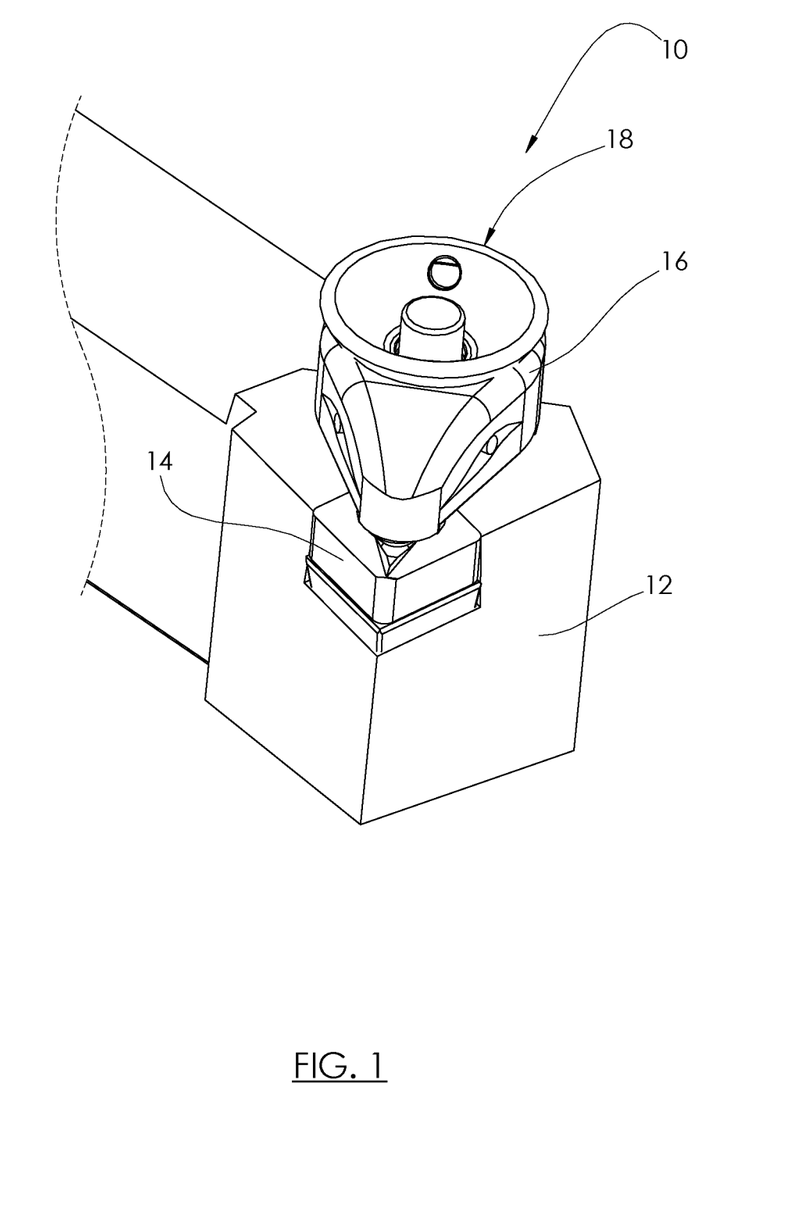
FIG. 1 is a perspective view of an example of a cutting tool.
Figure 2:
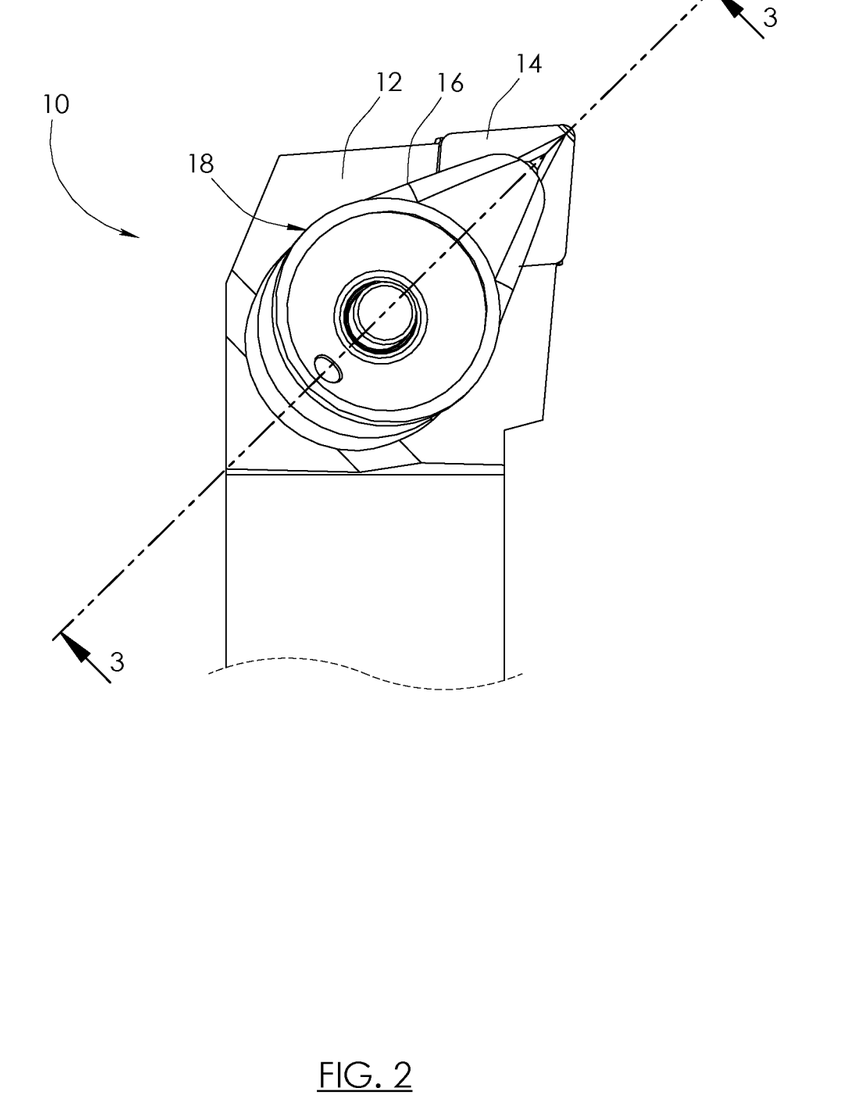
FIG. 2 is a top view of the cutting tool.

Referring to FIGS. 1 and 2, an example of a cutting tool is shown generally at reference numeral 10. The cutting tool 10 is can be used in various turning and/or boring cutting operations.

In the example illustrated, the cutting tool 10 includes a holder 12. A replaceable insert 14 is shown supported by the holder 12 in a cutting position. The cutting tool 10 further includes a clamp 16 and a retention mechanism 18. The retention mechanism 18 releasably couples the holder 12 and the claim 16 so that the clamp 16 bears against the insert 14 to retain the insert 14 in the cutting position. In the example illustrated, the clamp 16 is releasably coupled to the holder 12 by the retention mechanism 18 without the use of a threaded fastener.

Figure 3:
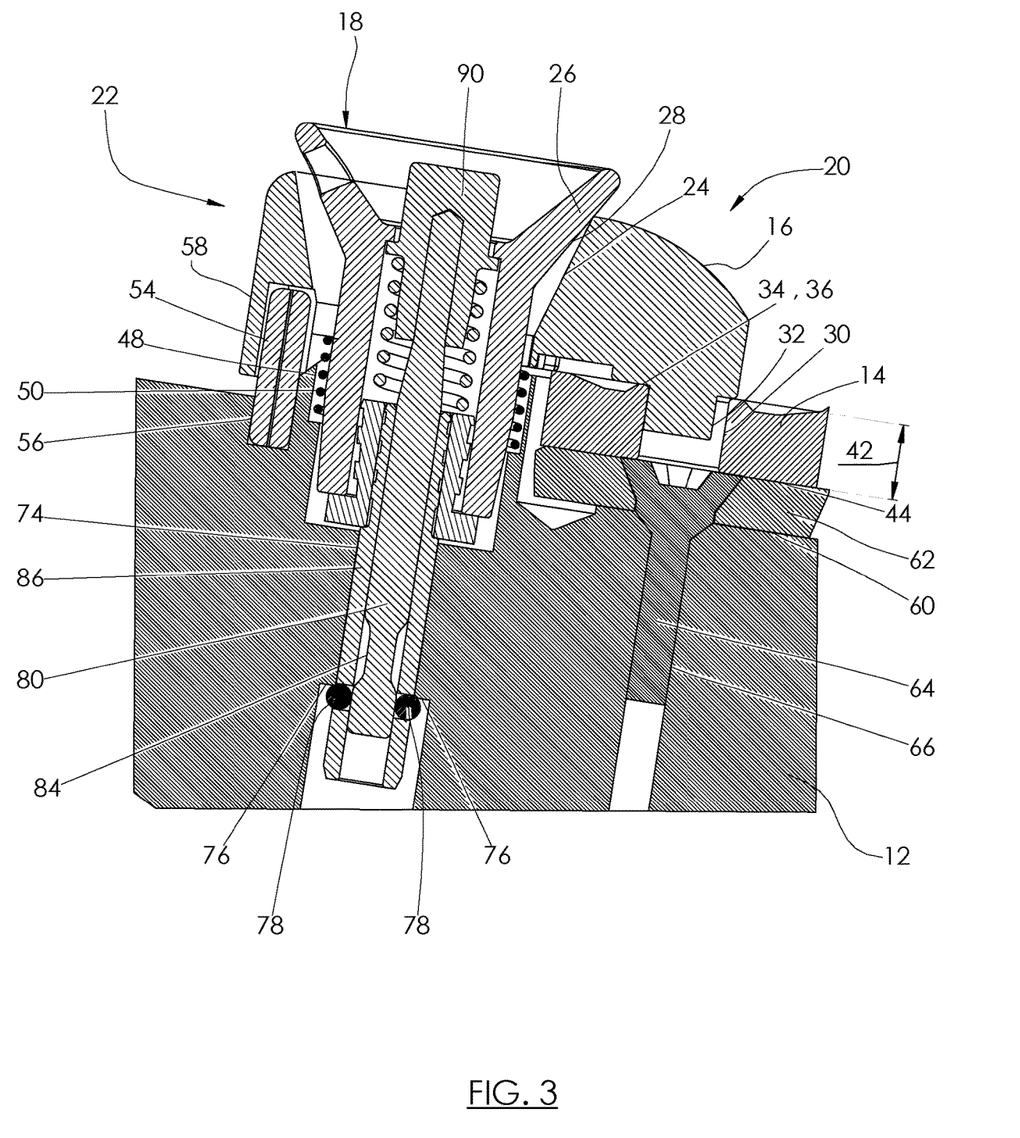
FIG. 3 is a sectional view along line 3-3 in FIG. 2.

Referring to FIG. 3, the retention mechanism 18 releasably connects the holder 12 and the clamp 16, and has alternate locked (shown) and unlocked states. In the example illustrated, the clamp 16 includes a forward portion 20 for bearing against the insert 14, a rearward portion 22, and a recess 24 arranged intermediate the forward and rearward portions 20, 22. As shown, the recess 24 receives the retention mechanism 18. In the example illustrated, the retention mechanism 18 includes a collar 26, and the recess 24 is sized and shaped to receive the collar 26. In the locked state, as illustrated, an outward surface 28 of the collar 26 can be urged against an upper portion of the recess 24. In the example illustrated, the outward surface 28 of the collar 26 and the recess 24 are complementary and can be elliptical frusto-conical in shape.

In the example illustrated, the insert 14 includes a central hole 30, and the forward portion 20 of the clamp 16 includes a downwardly extending protrusion 32 that engages the central hole 30. In the locked state, as illustrated, an outer surface of the protrusion 32 can be urged rearwardly against an inner side wall of the central hole 30. In the example illustrated, the forward portion 20 of the clamp 16 includes a contact surface 34 surrounding the protrusion 32. The contact surface 34 can at least partially engage a top surface 36 of the insert 14 surrounding the central hole 30. In the locked state, as illustrated, the contact surface 34 can be urged downwardly against the top surface 36.

Figure 4:
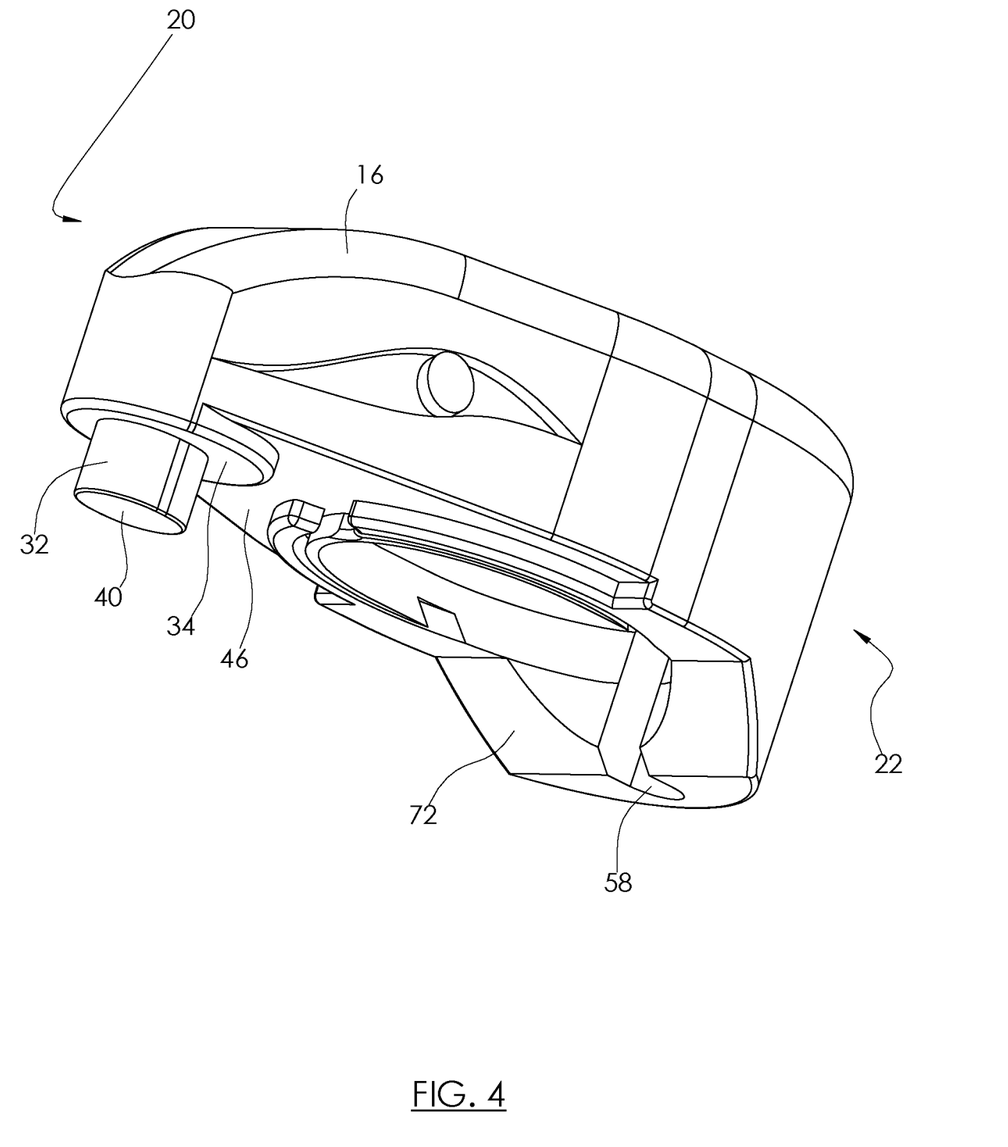
FIG. 4 is a perspective view of a clamp of the cutting tool.
Figure 5:
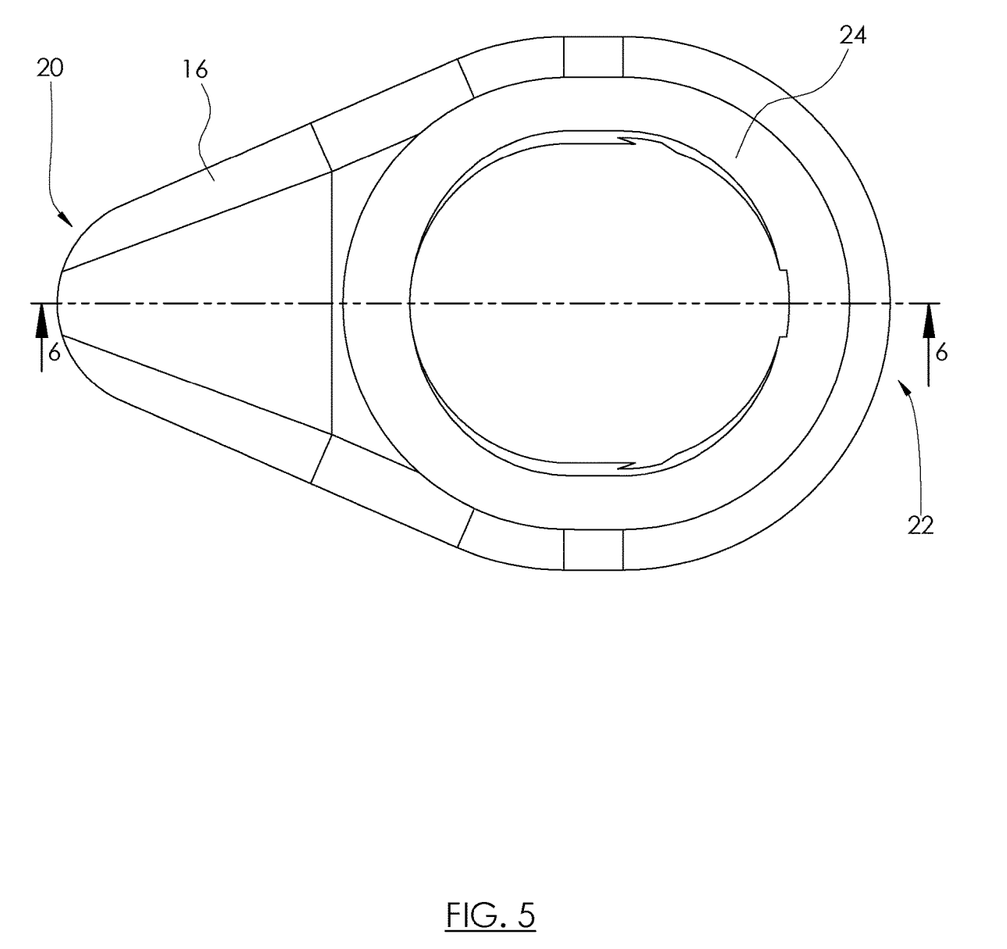
FIG. 5 is a top view of the clamp.
Figure 6:
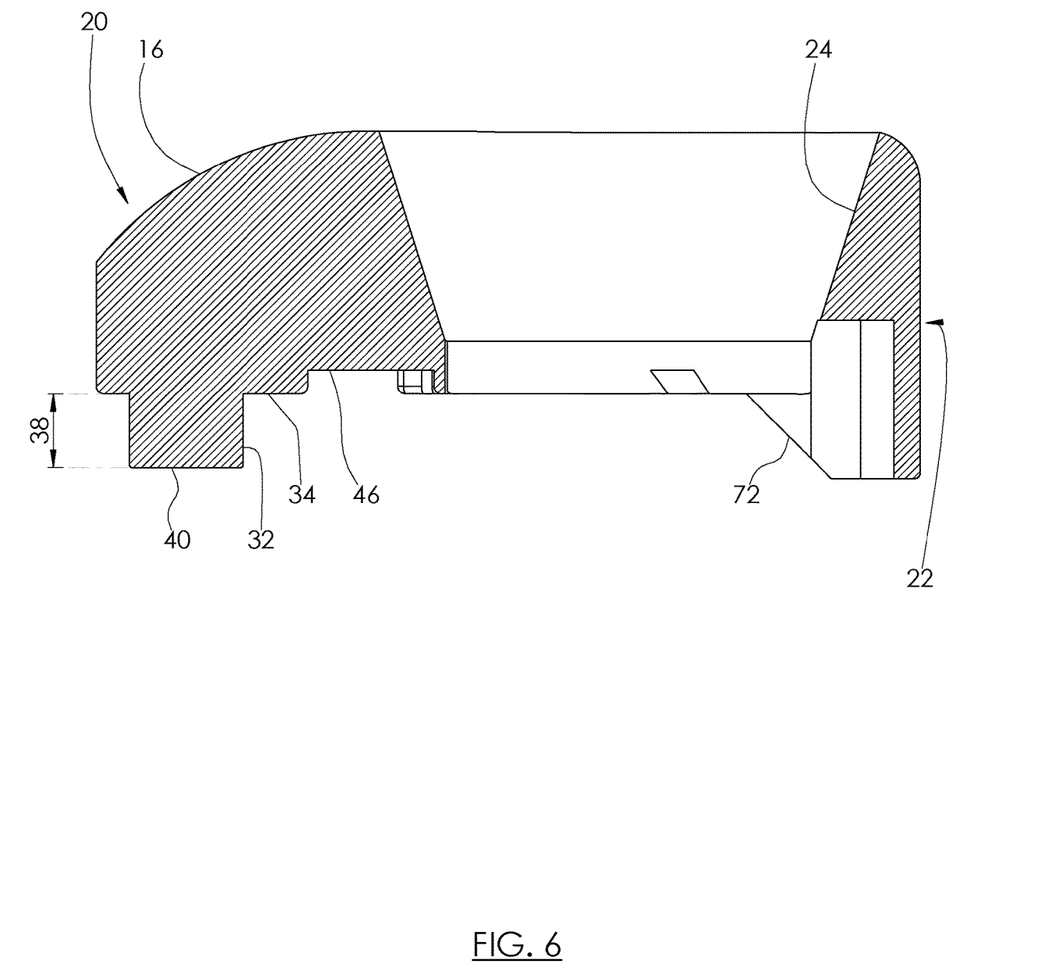
FIG. 6 is a sectional view along line 6-6 in FIG. 5.

Referring to FIGS. 4, 5 and 6, a height dimension 38 of the protrusion 32 between the contact surface 34 and an end surface 40 can be greater than 50% of a height dimension 42 of the insert 14 between the top surface 36 and a bottom surface 44 (shown in FIG. 3). In the example illustrated, the forward portion 20 of the clamp 16 includes a lower surface 46 extending between the contact surface 34 and the recess 24. The lower surface 46 can be offset from the contact surface 34 in a direction away from the insert 14. The offset can provide airflow around the insert 14 and reduce heat transfer between the insert 14 and the clamp 16.

Figure 7:
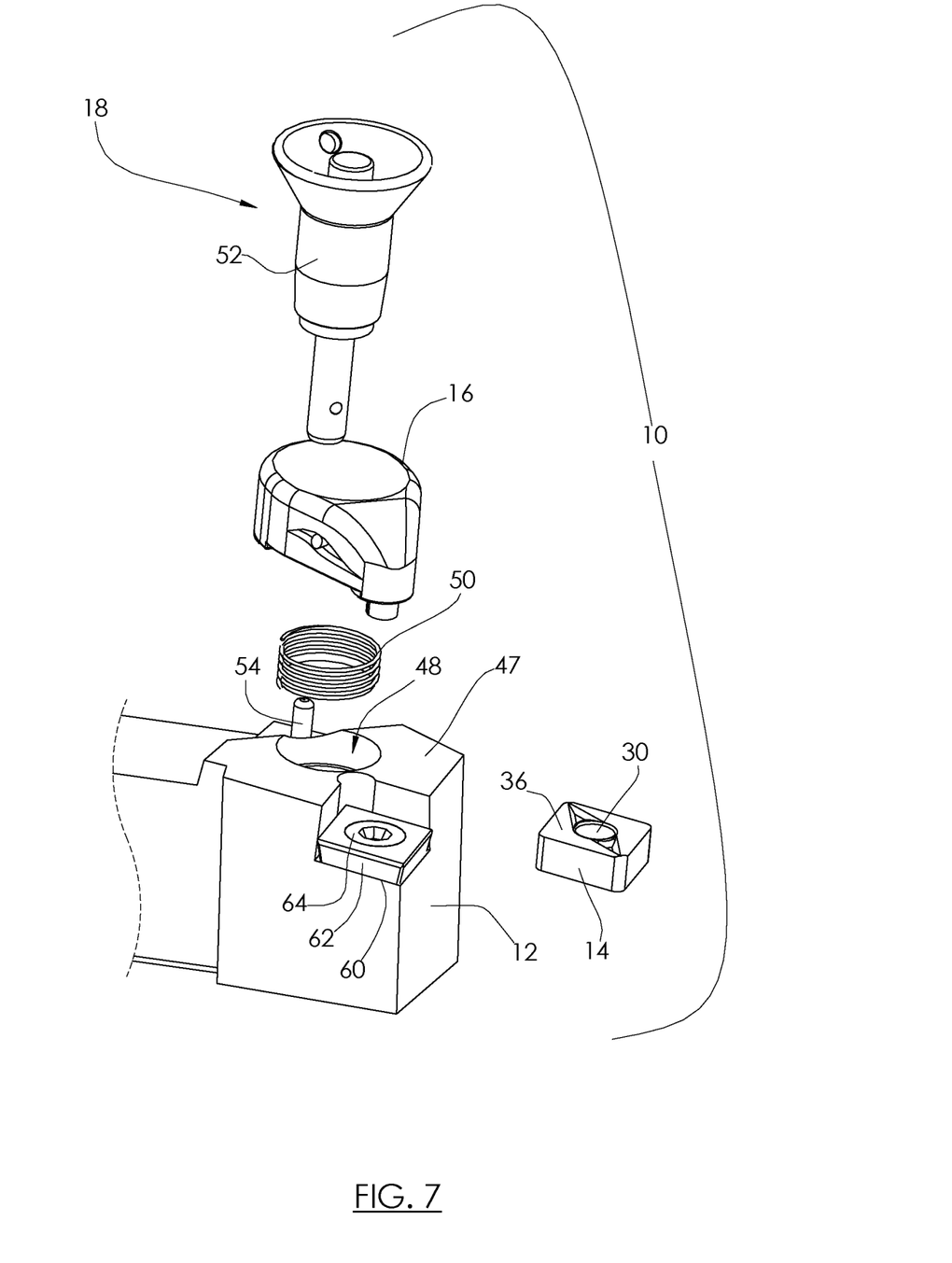
FIG. 7 is an exploded view of the cutting tool.

Referring to FIG. 7, the holder 12 includes an upper supporting surface 47 and a cylindrical cavity 48 that is formed therein. The cylindrical cavity 48 receives the retention mechanism 18. In the example illustrated, a spring 50 is seated in the cylindrical cavity 48 between the holder 12 and a body 52 of the retention mechanism 18. The spring 50 biases the retention mechanism 18 away from the holder 12.

Referring to FIGS. 3 and 7, a pin 54 is held captive in first and second slots 56, 58 of the holder 12 and the rearward portion 22 of the clamp 16, respectively. The pin 54 can help maintain a centered position of the clamp 16 relative to the holder 12. In the example illustrated, the holder 12 includes a lower supporting surface 60. A shim 62 is shown supported by the lower supporting surface 60, and is disposed underneath the insert 14. The shim 62 is shown fastened to the holder 12 by a fastener 64. The fastener 64 can be received by a bore 66 that is formed in the lower supporting surface 60 of the holder 12.

Figure 8:
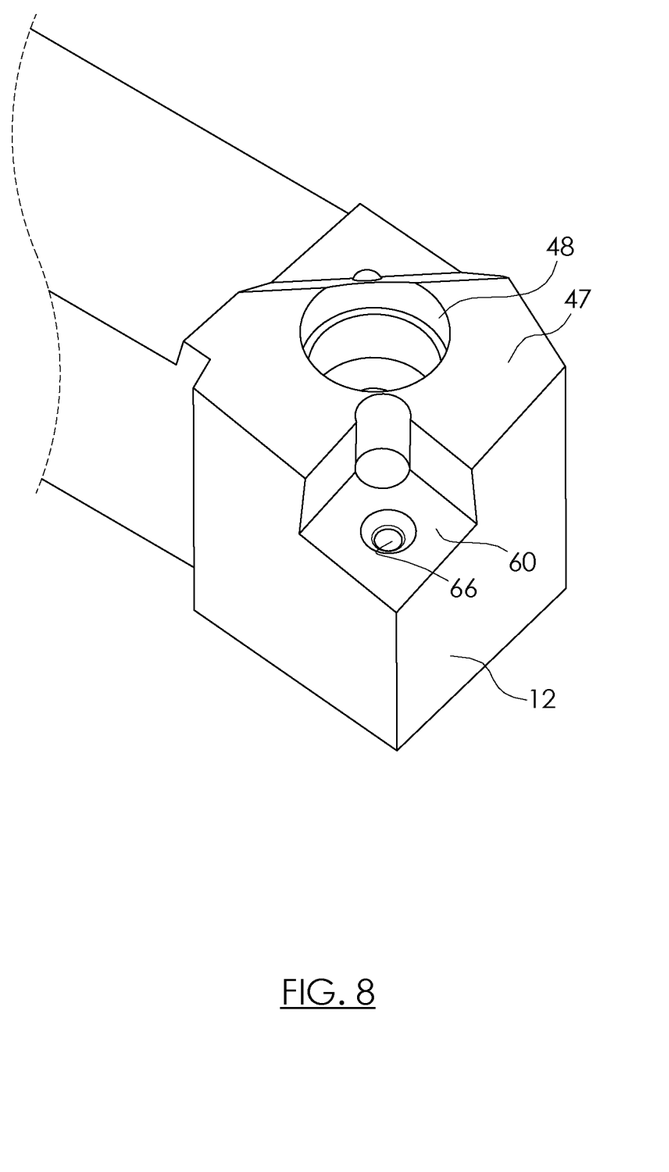
FIG. 8 is a perspective view of a holder of the cutting tool.
Figure 9:
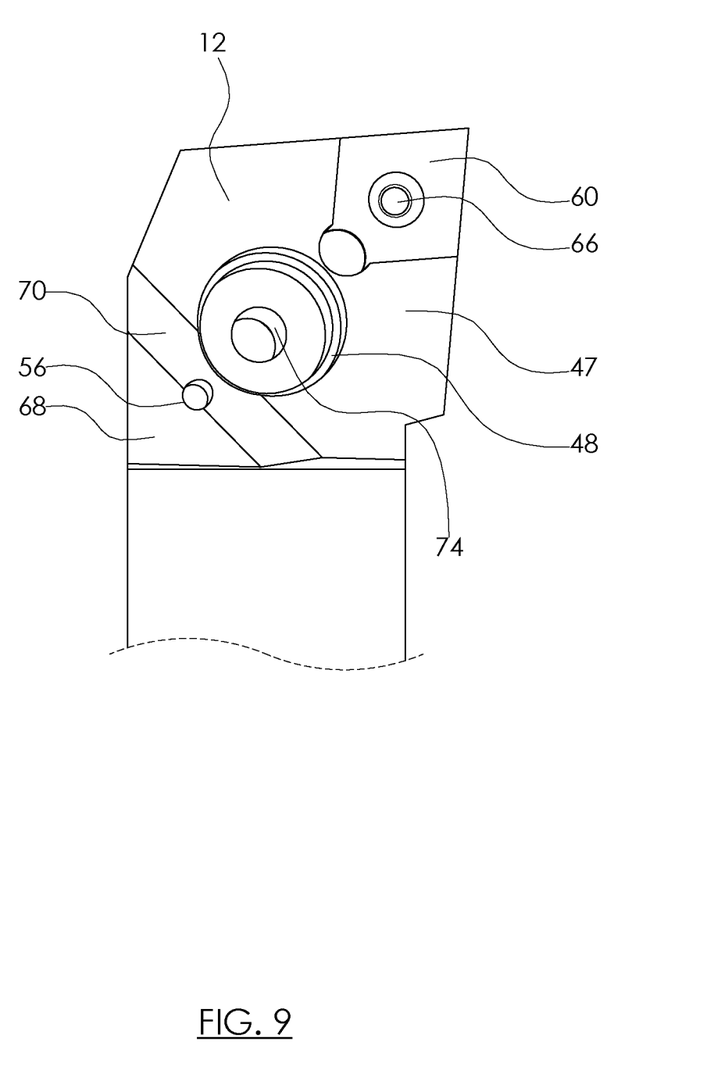
FIG. 9 is a top view of the holder.
Figure 10:
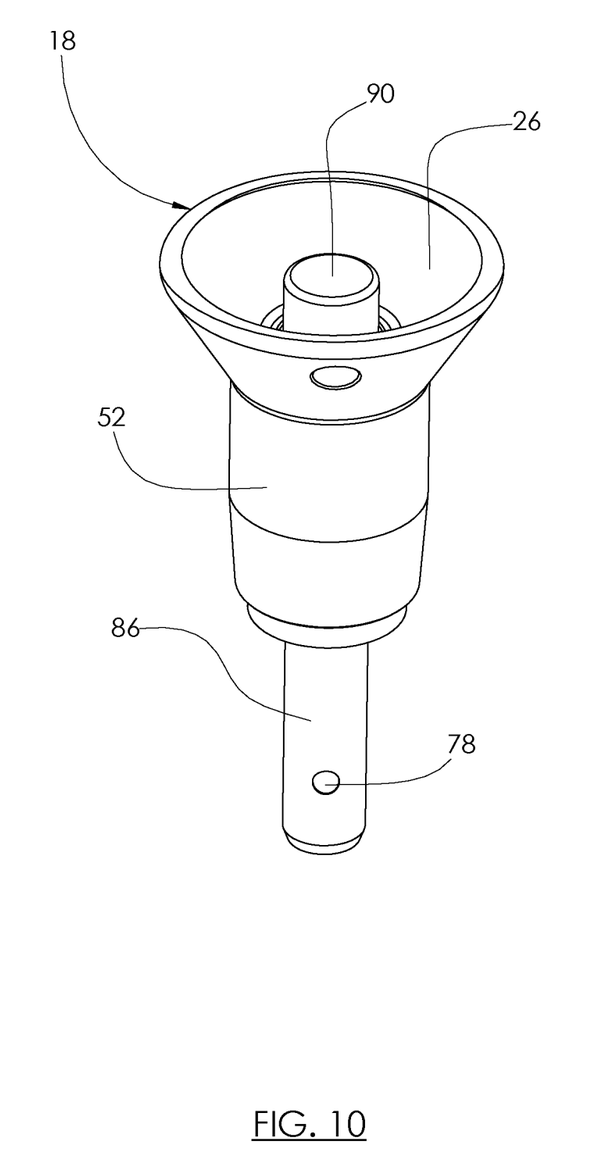
FIG. 10 is a perspective view of a retention mechanism of the cutting tool.
Figure 11:
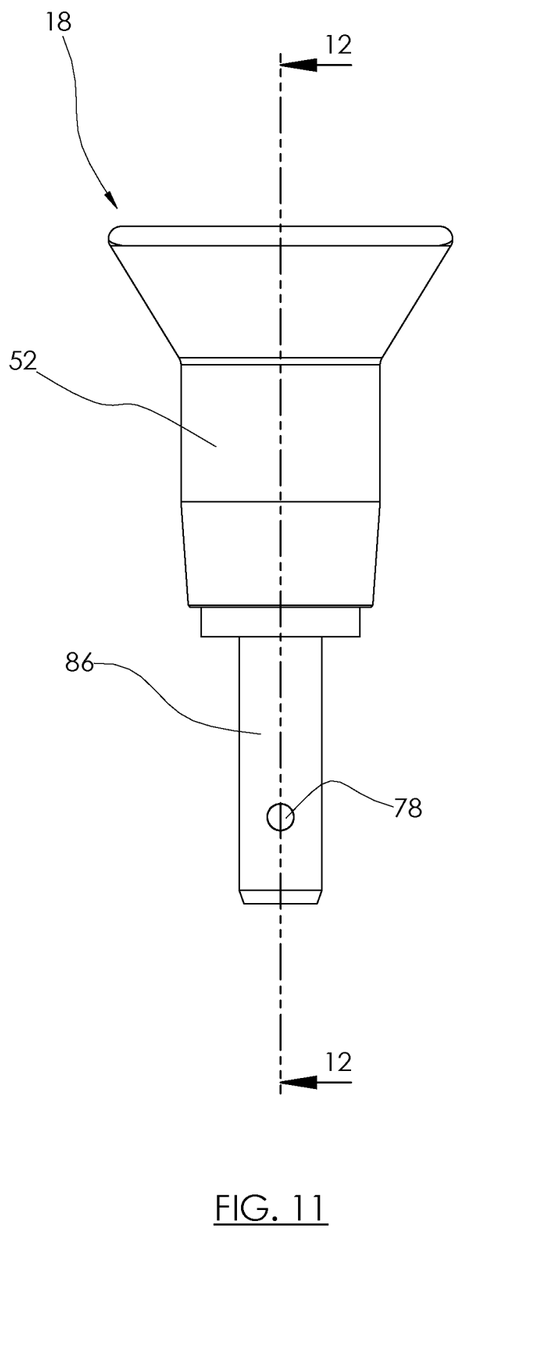
FIG. 11 is a side view of the retention mechanism.
Figure 12:
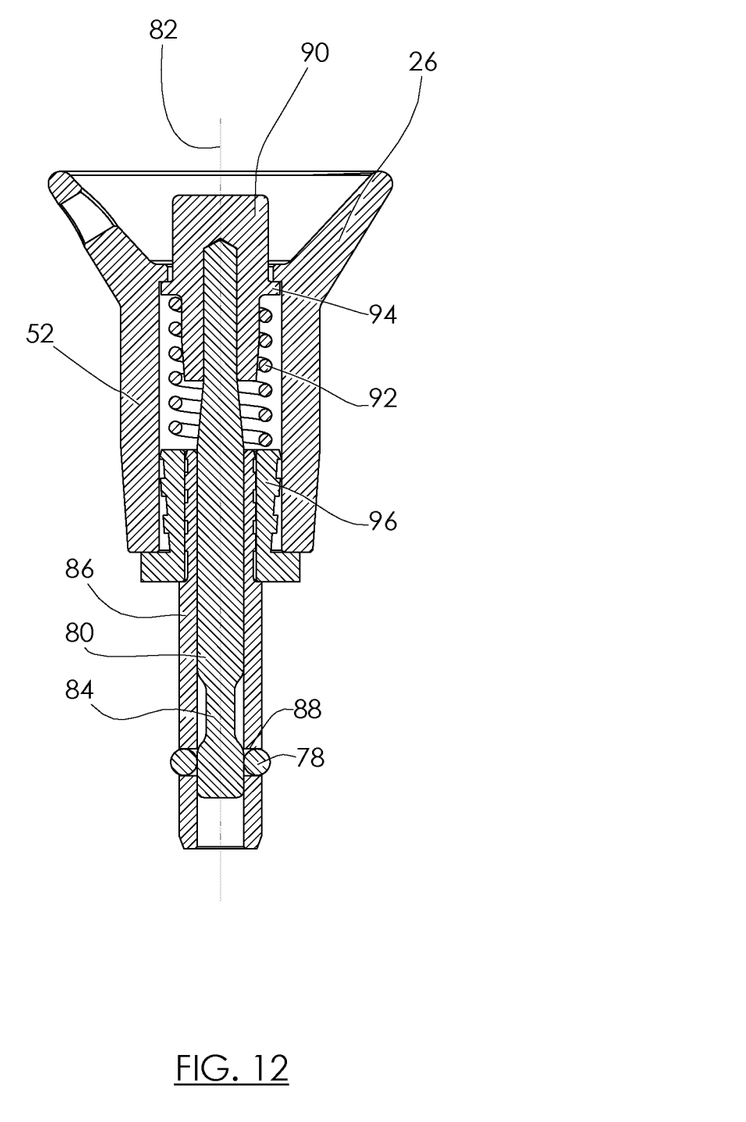
FIG. 12 is a sectional view along line 12-12 in FIG. 11, showing the retention mechanism in a retracted position.
Figure 13:
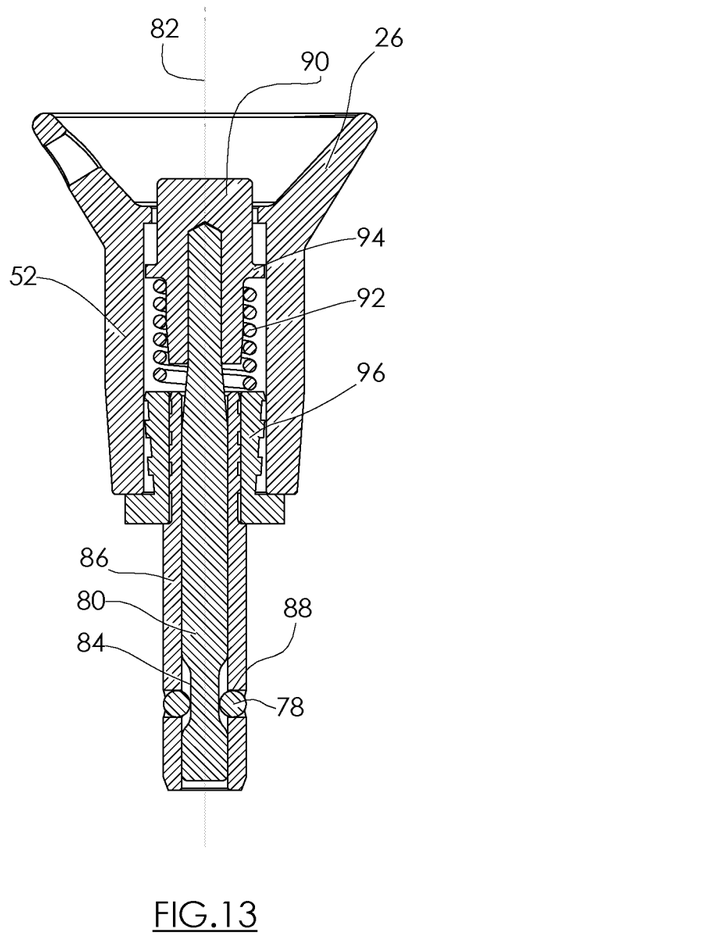
FIG. 13 is a sectional view along line 12-12 in FIG. 11, showing the retention mechanism in an extended position.

Referring to FIGS. 8 and 9, the holder 12 includes a rear surface 68 and an inclined support surface 70 that extends between the upper supporting surface 47 and the rear surface 68. The inclined support surface 70 cooperates with an inclined surface 72 of the clamp 16 (shown in FIGS. 4 and 6) to act as a wedge so that downward force applied by the retention mechanism 18 onto the clamp 16 resolves into rearward force by the clamp 16 onto the insert 14.

Referring again to FIG. 3, the holder 12 includes a bore 74 that receives a portion of the retention mechanism 18. An annular step 76 is disposed within the bore 74. The retention mechanism 18 includes ball bearings 78. The annular step 76 and the ball bearings 78 function as detent elements that interengage in the locked state and disengage in the unlocked state.

Referring to FIGS. 10, 11, 12 and 13, and with continued reference to FIG. 3, the retention mechanism 18 includes a shaft 80 that is coupled to the ball bearings 78. The shaft 80 can translate along its axis 82 between retracted and extended positions. In the retracted position (FIG. 12), the ball bearings 78 are positioned radially outwardly to catch the annular step 76. In the extended position (FIG. 13), the ball bearings 78 can be moved radially inwardly to clear the annular step 76. In the example illustrated, the shaft 80 includes a narrowed section 84 that accommodates the ball bearings 78 when in the extended position. In the example illustrated, the shaft 80 is housed in a barrel 86 that includes apertures 88. The apertures 88 are sized and shaped to retain the ball bearings 78.

In the example illustrated, the retention mechanism 18 includes a button 90 for manually actuating the shaft between the retracted and extended positions. Accordingly, when the tool 10 is in the locked state, a user can quickly and easily push the button 90 to move the retention mechanism 18 from the retracted to the extended position, which causes the ball bearings 78 move radially inwardly to clear the annular step 76 and permit disengagement of the retention mechanism 18. In this unlocked state, the insert 14 can be disassembled from the rest of the tool 10 and replaced.

In the example illustrated, the button 90 is arranged within the collar 26. As illustrated, an upper surface of the button 90 can be recessed relative to an upper rim of the collar 26. This can prevent the button 90 from being pushed inadvertently, and/or can prevent damage to the button 90 by chips from a cutting operation. In some examples, a cap (not shown) can be positioned on top of the collar 26 to further protect the button 90. The cap can include a projection that is retained in the hole that is shown in the collar 26.

In the example illustrated, the retention mechanism 18 includes a spring 92 that is held captive between a flange 94 of the button 90, and a cuff 96 that is spaced apart from the button 90 along the axis 82. The spring 92 can bias the shaft 80 to the retracted position. In the example illustrated, the barrel 86 is mounted to the body 52 by the cuff 96.

While the above description provides examples of one or more apparatuses and/or methods, it will be appreciated that other apparatuses and/or methods may be within the scope of the accompanying claims.

I claim:

1. A cutting tool, comprising:
   a holder;
   an insert supported by the holder in a cutting position;
   a clamp releasably coupled to the holder and configured to bear against the insert to retain the insert in the cutting position; and
   a retention mechanism configured to releasably connect the holder and the clamp, the retention mechanism having alternate locked and unlocked states,
   wherein the clamp comprises a forward portion for bearing against the insert, a rearward portion, and a recess arranged intermediate the forward and rearward portions, the recess configured to receive the retention mechanism,
   wherein the holder comprises a first detent element and the retention mechanism comprises a second detent element, and the first and second detent elements are configured to interengage in the locked state and disengage in the unlocked state, and
   wherein the holder comprises a bore configured to receive a portion of the retention mechanism, the first detent element comprises an annular step disposed within the bore, and the second detent element comprises at least one ball bearing that is configured to catch the annular step in the locked state.

2. The cutting tool of claim 1, wherein the clamp is releasably coupled to the holder without a threaded fastener.

3. The cutting tool of claim 1, wherein the retention mechanism comprises a collar, and the recess is sized and shaped to receive the collar.

4. The cutting tool of claim 3, wherein, in the locked state, an outward surface of the collar is urged against an upper portion of the recess.

5. The cutting tool of claim 4, wherein the outward surface of the collar and the recess are complementary and elliptical frusto-conical in shape.

6. The cutting tool of claim 1, wherein the insert comprises a central hole, the forward portion of the clamp comprises a downwardly extending protrusion that is configured to engage the central hole, and, in the locked state, an outer surface of the protrusion is urged against an inner side wall of the central hole.

7. The cutting tool of claim 6, wherein the forward portion of the clamp comprises a contact surface surrounding the protrusion and configured to at least partially engage a top surface of the insert surrounding the central hole, and a height dimension of the protrusion between the contact surface and an end surface is greater than 50% of a height dimension of the insert between the top surface and a bottom surface.

8. The cutting tool of claim 7, wherein the forward portion of the clamp comprises a lower surface extending between the contact surface and the recess, the lower surface being offset from the contact surface in a direction away from the insert.

9. The cutting tool of claim 1, wherein the holder comprises a cylindrical cavity configured to receive the retention mechanism, and comprising a spring seated in the cylindrical cavity between the holder and a body of the retention mechanism, the spring configured to bias the retention mechanism away from the holder.

10. The cutting tool of claim 1, comprising a pin held captive in first and second slots of the holder and the rearward portion of the clamp, respectively.

11. The cutting tool of claim 1, wherein the retention mechanism comprises a shaft coupled to the at least one ball bearing and translatable axially between a retracted position in which the at least one ball bearing is positioned radially outwardly to catch the annular step, and an extended position in which the at least one ball bearing is movable radially inwardly to clear the annular step.

12. The cutting tool of claim 11, wherein the shaft comprises a narrowed section that is configured to accommodate the at least one ball bearing when in the extended position, and the shaft is housed in a barrel comprising at least one aperture that is sized and shaped to retain the at least one ball bearing respectively.

13. The cutting tool of claim 12, wherein the retention mechanism comprises a button for manually actuating the shaft between the retracted and extended positions, the retention mechanism comprises a collar, and the button is arranged within the collar, with an upper surface of the button being recessed relative to an upper rim of the collar.

14. The cutting tool of claim 13, wherein the shaft is biased to the retracted position.

15. The cutting tool of claim 14, wherein the retention mechanism comprises a collar, and the recess is sized and shaped to receive the collar.

16. The cutting tool of claim 15, wherein, in the locked state, an outward surface of the collar is urged against an upper portion of the recess.

17. The cutting tool of claim 16, wherein the outward surface of the collar and the recess are complementary and elliptical frusto-conical in shape.

18. The cutting tool of claim 14, wherein the insert comprises a central hole, the forward portion of the clamp comprises a downwardly extending protrusion that is configured to engage the central hole, and, in the locked state, an outer surface of the protrusion is urged against an inner side wall of the central hole.

19. The cutting tool of claim 18, wherein the forward portion of the clamp comprises a contact surface surrounding the protrusion and configured to at least partially engage a top surface of the insert surrounding the central hole, and a height dimension of the protrusion between the contact surface and an end surface is greater than 50% of a height dimension of the insert between the top surface and a bottom surface.

20. The cutting tool of claim 19, wherein the forward portion of the clamp comprises a lower surface extending between the contact surface and the recess, the lower surface being offset from the contact surface in a direction away from the insert.

* * * * *